United States Patent [19]
Kim

[11] Patent Number: 5,805,758
[45] Date of Patent: Sep. 8, 1998

[54] OPTICAL FIBER CONNECTOR PROTECTING SUPPORTER

[75] Inventor: Hak-Suk Kim, Gumi, Rep. of Korea

[73] Assignee: SamSung Electronics Co., Ltd., Suwon, Rep. of Korea

[21] Appl. No.: 789,481

[22] Filed: Jan. 27, 1997

[30] Foreign Application Priority Data

Jan. 25, 1996 [KR] Rep. of Korea ............... 1996-1598

[51] Int. Cl.⁶ .................................................. G02B 6/36
[52] U.S. Cl. ............................................................ 385/137
[58] Field of Search ........................... 385/134, 136–137

[56] References Cited

U.S. PATENT DOCUMENTS

| | | | |
|---|---|---|---|
| 4,714,315 | 12/1987 | Krause | 350/96.2 |
| 5,085,494 | 2/1992 | Wesson et al. | 385/98 |
| 5,153,932 | 10/1992 | Blyler, Jr. et al. | 385/15 |
| 5,222,184 | 6/1993 | Foss | 385/137 X |
| 5,249,246 | 9/1993 | Szanto | 385/96 |
| 5,295,219 | 3/1994 | Koya et al. | 385/134 |
| 5,353,366 | 10/1994 | Bossard | 385/137 X |
| 5,384,872 | 1/1995 | Jacobs-Cook et al. | 385/31 |
| 5,394,496 | 2/1995 | Caldwell et al. | 385/70 |
| 5,440,666 | 8/1995 | Burek et al. | 385/135 |
| 5,515,472 | 5/1996 | Mullaney et al. | 385/136 X |
| 5,530,786 | 6/1996 | Radliff et al. | 385/136 |
| 5,548,677 | 8/1996 | Kakii et al. | 385/92 |
| 5,590,234 | 12/1996 | Pulido | 385/136 X |
| 5,631,993 | 5/1997 | Cloud et al. | 385/136 X |
| 5,657,412 | 8/1997 | Caudrelier | 385/137 X |

FOREIGN PATENT DOCUMENTS 0 490 644 A1  6/1992  European Pat. Off. .

*Primary Examiner*—John D. Lee
*Attorney, Agent, or Firm*—Robert E. Bushnell, Esq.

[57] ABSTRACT

An optical fiber connector protecting supporter can protect the connector of optical fiber. The supporter may include a hook-shaped fixing pin located on the bottom of the supporter and for standing external vibration. The supporter includes a mechanical splicer holding recess located on the inner surface of the supporter and for accommodating the mechanical splicer, and a thermally shrinking tube holding groove located on the outer surface of the supporter and for accommodating the thermally shrinking tube. The supporter can use an optical fiber guide located at the outermost ends of the supporter and having a recess for holding the optical fiber. The supporter is capable of using both the mechanical splicer and thermally shrinking tube.

16 Claims, 3 Drawing Sheets

OPTICAL FIBER CONNECTOR PROTECTING SUPPORTER

This application makes reference to, incorporates the same herein, and claims all benefits accruing under 35 U.S.C. §119 from an application for OPTICAL FIBER COANECTOR PROTECTING SUPPORTER earlier filed in the Korean Industrial Property Office on 25 Jan. 1996 and there duly assigned Ser. No. 1598/1996.

BACKGROUND OF THE INVENTION

1. Field of the Invention

The present invention relates to optical fiber protectors. More particularly, the present invention relates to an optical fiber connector protecting supporter for protecting a connection point after splicing of an optical fiber and.

2. Description of the Related Art

According to a typical classification, one divides the splicings of optical fiber is roughly divided into fusion splicings in which the optical fiber is fused and coupled, and mechanical splicings in which the section of the optical fiber is cut and coupled. After splicing of an optical fiber, its connection point must be protected. This protection method depends upon whether the splicing was a fusion splicing or a mechanical splicing. Kakii et al. (U.S. Pat. No. 5,548,677, Housing Structure For Coupling And Releasing Optical Modules, Aug. 20, 1996) discusses a housing structure for coupling and releasing optical modules comprises three housings. A first housing includes a distal wall at one end, an opening at the other end, and the opening having a first protrusion part protruding toward inside of the opening. Caldwell et al. (U.S. Pat. No. 5,394,496, Optical Fiber Mechanical Splice, Feb. 28, 1995) discusses a mechanical splice which does not use any adhesive for holding the aligned fibers in position. A biasing means is employed for operating upon the gripping and alignment means to align and grip the fibers, by way of a sleeve member. Jacobs-Cook et al. (U.S. Pat. No. 5,384,872, Optical Device And A Method Of Manufacture Thereof, Jan. 24, 1995) discusses a block of monocrystalline silicon oriented so as to align a body surface in a crystallographic plane for selective etching to define a groove for receiving an optical waveguide and a reflecting surface facing the groove. Szanto (U.S. Pat. No. 5,249,246, Self-Contained Fiber Splicing Unit And Method For Splicing Together Optical Fibers, Sep. 28, 1996) discusses a self-contained unit and method for splicing together the ends of jacketed optical fibers. The unit comprises a guide to align fibers, such as a capillary tube, having opposite ends into which the ends of optical fibers to be splice passed until they are in contact in a central portion of the guide. Koya et al. (U.S. Pat. No. 5,295,219, Supporting Member For Optical Fiber Coupler, Mar. 15, 1994) discusses a support member for supporting an optical fiber coupler formed by arranging a plurality of optical glass fibers parallel to one another, then welding and drawing a part there of with a long and thin reinforcing material of quartz. Blyler, Jr. et al. (U.S. Pat. No. 5,153,932, Optical Couplers With Thermoformed Fibers, Oct. 6, 1992) discusses an optical coupler using round optical fibers whose ends have been formed into a predefined shape to allow greater physical packing densities in order to achieve greater uniform illumination efficiency. Wesson et al. (U.S. Pat. No. 5,085,494, Fiber Optic Splice Means And Method, Feb. 4, 1992) discusses a fiber optic cable splice means for splicing a fiber optic cable having a pair of fiber retaining elements with an opening for receiving the buffer casing at an end of a fiber optic cable with its bare optic fiber extending therefrom. Krause (U.S. Pat. No. 4,714,315, Method For Connecting Elements Of Optical Communication Technology To One Another Or To Elements Of Releasable Plug Connections, Dec. 22, 1987) discusses a method for connecting elements of optical communication technology to one another or to elements of releasable plug connections. Based on my study of these exemplars of the contemporary practice along with the prior art, I believe that there is a need for an effective optical fiber connector protector that can handle mechanical splicers or fusion connections.

SUMMARY OF THE INVENTION

Therefore, an object of the present invention is to provide an improved optical fiber protector.

Another object of the present invention is to provide an improved optical fiber connector protecting supporter for protecting a connection point after splicing of an optical fiber.

A further object of the present invention is to provide an optical fiber connector protecting supporter holding a thermally shrinking tube and mechanical splicers.

It is an object of the present invention to provide an optical fiber connector protecting supporter for using both fusion splicing and mechanical splicing.

It is another object of the present invention to provide an optical fiber connector protecting supporter for using both a thermally shrinking tube and mechanical splicer.

It is still another object of the present invention to provide an optical fiber connector protecting supporter for standing external environment such as vibration for a long time.

To accomplish the above objects of the present invention, there is provided an optical fiber connector protecting supporter having a function of protecting the connector of optical fiber, the supporter including a hook-shaped fixing pin located on the bottom of the supporter and for standing external vibration, a mechanical splicer holding recess located on the inner surface of the supporter and for accommodating the mechanical splicer, and a thermally shrinking tube holding groove located on the outer surface of the supporter and for accommodating the thermally shrinking tube. An optical fiber guide may be located at the outermost ends of the supporter, each guide having a recess for holding the optical fiber. The supporter is capable of using both the mechanical splicer and thermally shrinking tube.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, a preferred embodiment of the present invention will be described with reference to the attached drawings.

Figure 3:
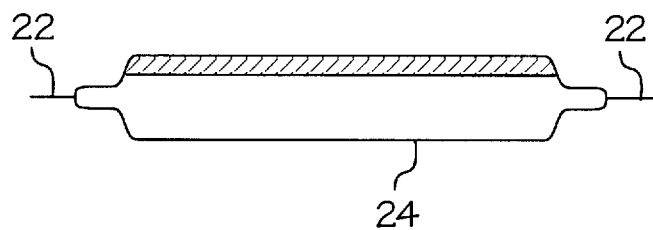
FIG. 3 shows a thermally shrinking tube made by a fusion splicing.

Turning to the drawings, FIG. 3 shows a thermally shrinking tube 24 in accordance with a fusion splicing. During splicing of an optical fiber 22, thermally shrinking tube 24 is used in order to protect its connection point. The fusion splicing must be performed with a connecting device, and its splicing technology is so difficult that only a person skilled in the art is able to perform it.

Figure 4:
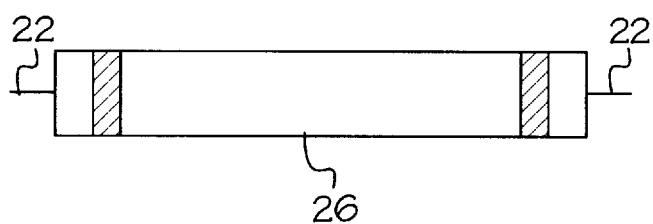
FIG. 4 shows a mechanical splicer made by a mechanical splicing.

FIG. 4 shows mechanical splicer 26 in accordance with the mechanical splicing. During a mechanically splicing of optical fiber 22, mechanical splicer 26 is used. This mechanical splicing is regarded as being easy to handle because only the section of the optical fiber needs to be cut. The fusion splicing and mechanical splicing are not standardized but can be used in combination.

Figure 1A:
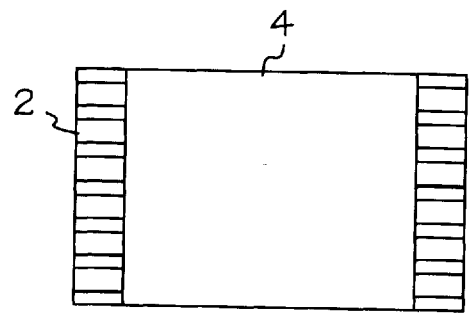
FIGS. 1A, 1B, 1C and 1D show an optical fiber connector protecting supporter according to a contemporary practice.
Figure 1B:
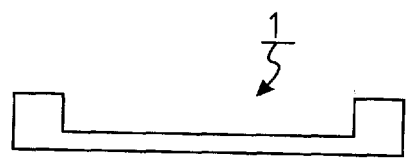
Figure 1C:
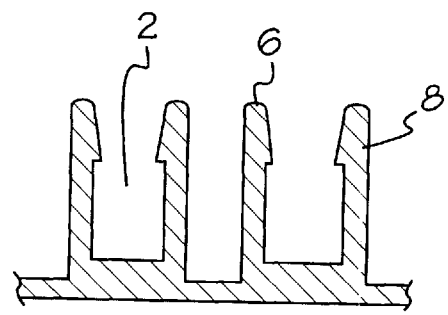
Figure 1D:
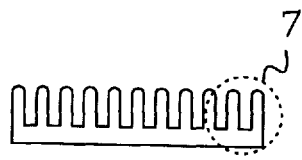

FIGS. 1A, 1B, 1C and 1D show an optical fiber connector protecting supporter according to a contemporary practice, to which only one of either thermally shrinking tube 24 or mechanical splicer 26 can be inserted. Referring to FIG. 1A, connector holding grooves 2 to which thermally shrinking tube 24 and mechanical splicer 26 are inserted are located on both sides of connector protecting supporter 4. The plan view is shown as in reference number 1. FIG. 1C is a side view of connector protecting supporter 4, and a detailed view of reference number 7 as shown in FIG. 1D. In this figure, holding grooves 2 are located between lead-in guides 6 having a free detachment preventing stop 8.

In case of fusion splicing, the optical fiber connector protecting supporter, according to a contemporary practice, uses one for fused connector. In case of mechanical splicing, a supporter for mechanical splicer is used. Therefore, in case of the fusion splicing and mechanical splicing in combination, the optical fiber connector protecting supporter, according to a contemporary practice, cannot be used. The optical fiber connector protecting supporter, according to a contemporary practice, is capable of using only one splicing method. Thus, only one splicing is permitted in some of the contemporary methods. In addition, there is no device for protecting the optical fiber inserted into the connector so that it may be cut due to vibration or impacts.

Figure 2A:
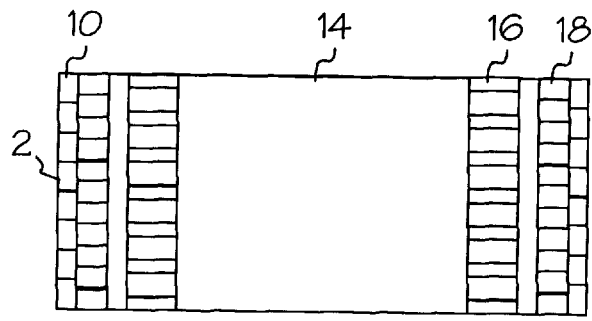
FIGS. 2A, 2B, and 2C show one embodiment of an optical fiber connector protecting supporter constructed according to the principles of the present invention.
Figure 2B:
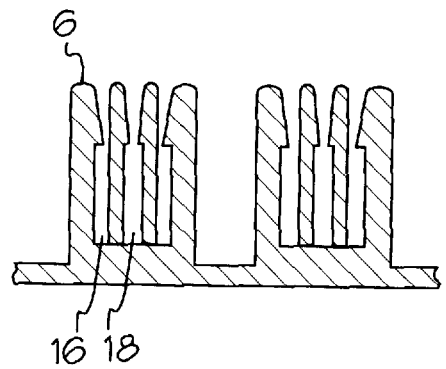
Figure 2C:

An embodiment of the present invention provides a contrast. Referring to FIGS. 2A through 2C, hook-shaped fixing pin 20 for standing external vibration is located on the bottom of optical fiber connector 14. Mechanical splicer holding recess 16 to which mechanical splicer 11 is inserted is located on the inner surface of optical fiber connector protecting supporter 14. Thermally shrinking tube holding recess 18 for splicing thermally shrinking tube 24 is located on the outer surface of optical fiber connector protecting supporter 14. On both outermost ends of optical fiber connector protecting supporter 14, optical fiber guide 10 having a sponge recess for holding the optical fiber is located in order to eliminate the environmental weakness of the optical fiber. The optical fiber guide 10 is capable of holding the optical fiber due to the sponge's resilient force.

According to such structure, in case of fusion splicing, thermally shrinking tube 24 is inserted into thermally shrinking tube holding recess 18 of optical fiber connector protecting supporter 14. For its convenient insertion, lead-in guide 6 is provided, and the same detachment preventing stop 8 as in the contemporary technology is offered to prevent free detachment.

In case of mechanical splicing, mechanical splicer 26 is inserted into mechanical splicer holding recess 16 of optical fiber connector protecting supporter 14. For its convenient insertion, lead-in guide 6 is provided, and a detachment preventing stop 8 is offered to prevent free detachment. The optical fiber connected to the thermally shrinking tube or mechanical splicer is inserted into sponge recess 12 of optical fiber guide 10, with the recess being spread.

As described above, the present invention is able to accommodate both the fusion splicing and mechanical splicing so that there is no need of dualizing the optical fiber connector protecting supporter. In addition, if there is caused a trouble in the fused connection point, the mechanical splicing can be used in combination. Furthermore, the fusion connector and mechanical splicer are fixed firmly, and the lead-in portion of the optical fiber is held so as to be resistant against external environment such as vibration.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical fiber connector protecting supporter, comprising:

a generally planar base having top and bottom major surfaces and including first and second pairs of support members positioned adjacent at opposite ends for supporting at least a mechanical splicer for a mechanical splicing operation and a thermally shrinking tube for a fusion splicing operation:

at least one hook-shaped fixing pin affixed at the bottom surface of said base for absorbing vibrations during one of said mechanical splicing operation and said fusion splicing operation;

at least one mechanical splicer holding recess formed in each of the first pair of support members positioned at the opposite ends of said base for securing said mechanical splicer during said mechanical splicing operation of a first optical fiber; and at least one thermally shrinking tube holding recess formed in each of the second pair of support members positioned at the opposite ends of said base for securing said thermally shrinking tube during said fusion splicing operation of a second optical fiber.

2. The supporter of claim 1, wherein said base further comprises a first optical fiber guide positioned at outermost ends and having a first sponge recess for securing said first optical fiber.

3. The supporter of claim 2, wherein said base further comprises a second optical fiber guide positioned at outermost ends and having a second sponge recess for securing said second optical fiber.

4. The supporter of claim 2, wherein said first optical fiber guide comprises a resilient sponge.

5. The supporter of claim 3, wherein said second optical fiber guide comprises a resilient sponge.

6. The supporter of claim 2, wherein said first optical fiber connected to said thermally shrinking tube is inserted into a sponge recess of the first optical fiber guide.

7. The supporter of claim 3, wherein said second optical fiber connected to said mechanical splicer is inserted into a sponge recess of the second optical fiber guide.

8. The supporter of claim 1, wherein said base further comprises a lead-in guide juxtaposed to said thermally shrinking tube holding recess for securely maintaining said thermally shrinking tube in position for said fusing splicing operation.

9. The supporter of claim 8, wherein said lead-in guide further comprises a stopper for preventing detachment of said thermally shrinking tube during said fusing splicing operation.

10. The supporter of claim 1, wherein said base further comprises a lead-in guide juxtaposed to said mechanical splicer holding recess for securely maintaining said mechanical splicer in position during said mechanical splicing operation.

11. The supporter of claim 10, wherein said lead-in guide further comprises a stopper for preventing detachment of said mechanical splicer during said mechanical splicing operation.

12. An optical fiber connector protecting supporter, comprising:
- a base including first and second pairs of support members positioned adjacent at opposite ends for supporting at least a mechanical splicer for a mechanical splicing operation and a thermally shrinking tube for a fusion splicing operation:
- at least one mechanical splicer holding recess formed in each of the first pair of support members positioned at the opposite ends of said base for securing said mechanical splicer; and
- at least one thermally shrinking tube holding recess formed in each of the second pair of support members positioned at the opposite ends of said base for securing said thermally shrinking tube.

13. An optical fiber connector supporter, comprising:
- a base;
- hook-shaped fixing pins affixed at opposite ends of a bottom surface of said base for absorbing external vibration;
- first support members positioned in parallel with a lengthwise direction of said base at opposite ends of said base for supporting at least one mechanical splicer for a mechanical splicing operation, said first support members each having a plurality of mechanical splicer grooves defined to accommodate insertion of each of said mechanical splicers;
- second support members positioned adjacent to said first support members in parallel with the lengthwise direction of said base for supporting at least one thermally shrinking tube for a fusion splicing operation, said second support members each having a plurality of thermally shrinking tube grooves defined to accommodate insertion of each of said thermally shrinking tubes; and optical fiber guides located at outermost ends of said base and each having a recess for holding an optical fiber.

14. The supporter of claim 13, wherein each of said mechanical splicer grooves and said thermally shrinking tube grooves comprises of a stopper for preventing detachment of the respective mechanical splicer and thermally shrinking tube during one of said mechanical splicing operation and said fusion splicing operation.

15. The supporter of claim 13, wherein each optical fiber guide comprises a resilient sponge.

16. The supporter of claim 13, wherein each optical fiber guide has the same number of recesses as the maximum number of optical fibers that said base is capable of holding.

* * * * *